Sept. 15, 1936.                S. H. HANSEN                 2,054,563
                      EARTHQUAKE ACTUATED SHUT-OFF VALVE
                            Filed March 14, 1934

INVENTOR.
Sydney H. Hansen.
BY
Townsend & Loftus
ATTORNEYS.

Patented Sept. 15, 1936

2,054,563

UNITED STATES PATENT OFFICE 2,054,563

EARTHQUAKE ACTUATED SHUT-OFF VALVE

Sidney H. Hansen, Berkeley, Calif.

Application March 14, 1934, Serial No. 715,511

2 Claims. (Cl. 137—139)

This invention relates to automatic shut-off devices for use in connection with fluid conveying pipe lines in areas subject to earthquakes or shocks. The pipe lines conveying inflammable fluids such as gas and oil through dwellings or other buildings and the mains leading to such dwellings or buildings are liable to be broken by earthquakes or shocks. This, of course, produces a considerable hazard of explosion and fires. Therefore, it is the principal object of my invention to provide an efficient mechanism which may be associated with a pipe line conveying an inflammable fluid and which will automatically operate upon the occurrence of earthquakes or shocks to close a valve in such pipe line to discontinue further passage of fluid through the pipe line.

In practicing my invention, I provide a mechanism which includes a shut-off valve which is interposed in the pipe line to be controlled, which valve is normally maintained open. Associated with the valve is a mechanism capable of operation by earthquakes or shocks. This mechanism in the present embodiment includes a pendulum-like member which is operated by earthquakes or shocks, regardless of the direction of such quakes, and when so operated, acts through an efficient intermediate mechanism to close the valve and prevent further passage of fluid through the line in which the valve is interposed.

One form which the invention may assume is exemplified in the following description and illustrated by way of example in the accompanying drawing, in which.

Figure 1:
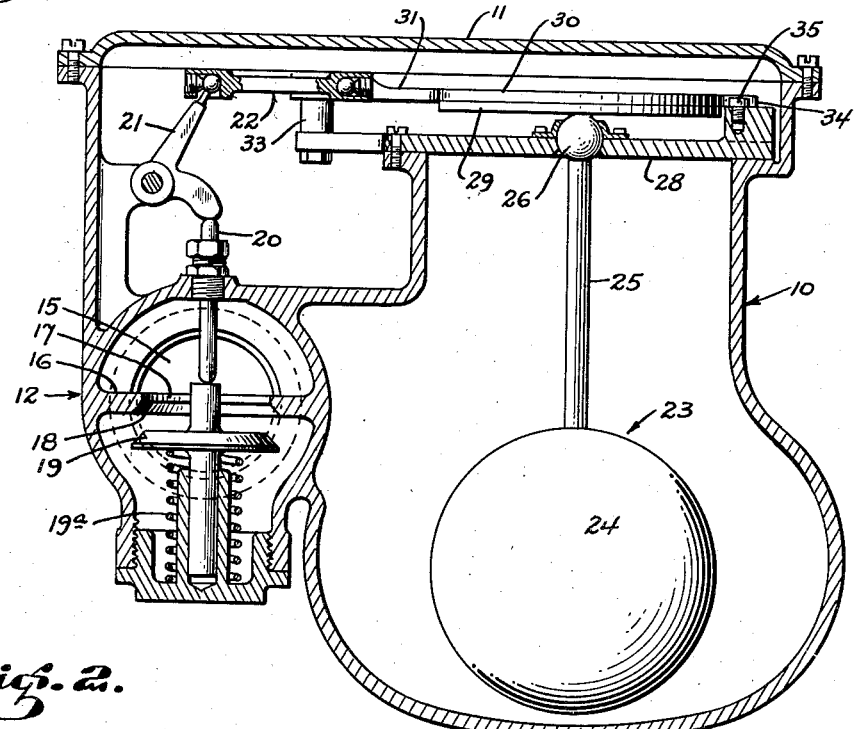
Fig. 1 is a central vertical sectional view through an apparatus embodying the preferred form of my invention.

In the accompanying drawing I have disclosed the preferred embodiment of my invention. The apparatus, however, may be produced in various other forms without departing from the invention. The apparatus illustrated in the drawing is primarily intended for use in shutting off the delivery of inflammable fluids, such as gas and oil through a main pipe line leading to a dwelling or other building immediately upon the occurrence of an earthquake or shock. The apparatus, however, may be used for closing pipe lines conveying other fluids than those referred to.

It is manifest that the shut-off of a delivery pipe line conveying inflammable fluids to a building or dwelling will absolutely prevent such inflammable fluids from escaping into the dwelling or building through the distributing pipes and associated apparatus and fittings in the building, which may be broken by the forces of earthquakes or shocks. This, of course, will eliminate the hazards of explosions and fires which usually occur after earthquakes and shocks due to the presence of inflammable fluids in dwellings and buildings.

The apparatus as illustrated in the drawing includes a housing 10 having a removable cover 11. The apparatus also includes a valve body 12 which, in the present instance, is illustrated as formed integral with the housing 10. It is apparent, however, that the valve body 12 may be otherwise attached to the housing 10 or in some instances may be entirely separate therefrom and located at a point comparatively remote from the housing 10.

The valve body 12 is of a conventional design including an inlet connection 14 and an outlet connection 15. The chamber within the body 12 is formed with a partition 16 interposed between the inlet and outlet connections 14 and 15, which partition 16 is formed with a valve port 17 which is circumscribed by valve seat 18. A valve member 19 is reciprocally mounted in the valve body 12 for cooperation with the seat 18 to control the passage of a fluid through the port 16. A spring 19a is arranged in the valve body and associated with the valve member 18 and constantly tends to maintain the valve 18 seated.

Reciprocally mounted in the valve body 12 above the valve member 18 is a valve control member 20, which abuts against the upper end of the stem of the valve member 18. By depressing the member 20 the valve 18 is unseated. Pivotally connected with the valve body is a valve operating lever 21 which is in the form of a bell crank lever. One arm of the lever 21 is positioned to engage the upper end of the member 20. The other arm of the lever 21 projects upwardly and is connected with a trip link 22.

Arranged within the housing 10 is what I prefer to term a pendulum 23, which includes a weighted sphere 24 secured on the lower end of an upwardly extending stem 25. Adjacent its upper end, this stem is connected with a support 28 rigidly secured in the upper end of the housing 10 by a ball and socket connection 26. Above the ball joint the stem 25 is fitted with a wobble disc 29 which is rigidly secured to the stem 25 and which assumes a perfectly horizontal position when the pendulum is dormant.

Overlying the wobble disc 29 is a trip disc 30 which is in register with the wobble disc and which has a radially projecting arm 31 hinged for vertical swinging movement to a trip lever 32. This trip lever 32 is pivoted intermediate its ends on a pintle 33 which is rigid with respect to the housing 10. The connection between the arm 31 and the trip lever 32 is such, however, that the arm 31 and its connected trip disc 30 will swing about the pintle 33 in conjunction with the lever 32, although permitting the trip disc 30 to swing vertically independently of the lever 32.

At the side of the trip disc 30 almost opposed to the arm 31, the trip disc 30 is provided with a trip finger 34 which is normally in engagement with a trip pin 35 rigidly fixed to the housing 10. However, by elevation of the trip disc 30, due to the operation of the wobble disc 29, the trip finger 34 may be disengaged from the trip pin 35 allowing swinging movement of the trip lever 32 about the pintle 33, which movement is induced by a tension spring 36 connected at one end to the trip lever 32 and at the other end to the housing 10 as at 37.

Figure 2:
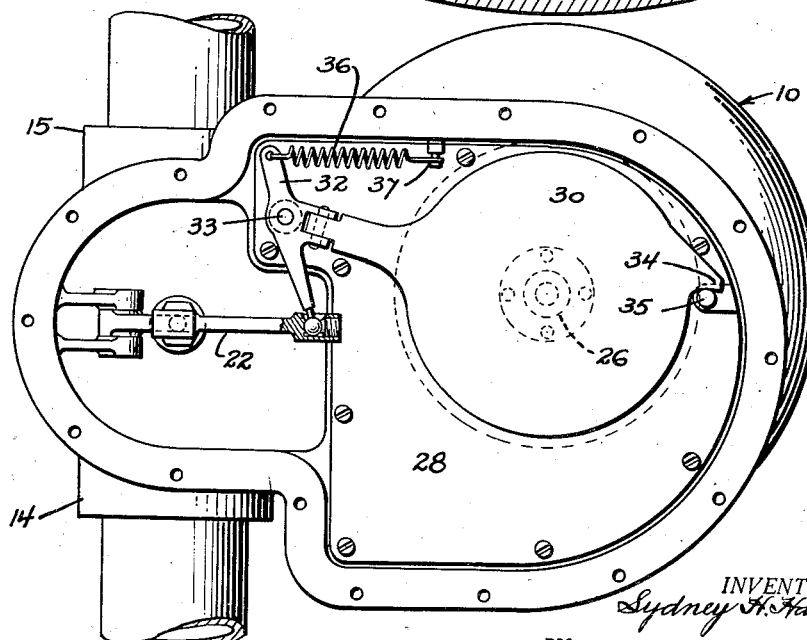
Fig. 2 is a plan view of the apparatus with the cover plate of the housing removed to clearly illustrate the trigger operating mechanism of the apparatus.

It will be seen that one arm of the trip lever 32 is connected to the trip link 22 so that operation of the trip lever 32 will be accompanied by operation of the valve lever 21. When the trip disc 30 is held in untripped position, illustrated in Fig. 2, with the finger 34 engaged with the trip pin 35, the valve lever 21 is maintained in a position holding the valve member 18 unseated through the medium of the member 20. However, when the trip disc 30 is tripped and is caused to swing about the pintle 33 by the spring 36, the valve lever 21 is moved to a position permitting the spring 19a to seat the valve 18 and shut-off further delivery of fluid through the valve.

To reset the mechanism after tripping, it is only necessary to remove the cover plate and move the trip disc 30 back to the position where it may be engaged with the trip pin 35.

In operation of the apparatus, it is constructed and assembled as illustrated in the drawing and the valve body 12 is interposed in the pipe line which it is desired to control. The trip disc 30 is then positioned so that its finger 34 will be engaged with the trip pin 35. In this position the valve will be open. Should an earthquake or shock occur, the pendulum 23 will be induced to swing. Due to the fact that the pendulum is suspended from a ball socket connection, the sphere 24 may swing in any direction and thus the pendulum will operate regardless of the direction of the shock. If the pendulum is caused to swing a sufficient amount, the marginal edge of the wobble disc 29 at one point will be elevated sufficiently to raise the trip disc 30 and disengage the finger 34 from the trip pin 35.

Due to the fact that both the wobble and tripping discs are circular, the above-described tripping action will occur regardless of the direction in which the pendulum swings.

Immediately the finger 34 is disengaged from the trip pin 35, the spring 36 will cause the lever 32 to swing about its pintle 33. This, through the medium of the link 22 and the valve lever 21, will release the valve 18 and permit its spring to seat the valve, shutting off further flow of fluid through the pipe line which it is desired to control.

It will be noticed that the entire operating mechanism is completely enclosed to prevent tampering and also that it may be placed underground, if desired.

From the foregoing it is obvious that I have provided a very efficient and effective apparatus for immediately shutting off the delivery of fluid through a pipe line upon the occurrence of an earthquake or shock, and while I have illustrated and described the apparatus in detail, it is to be understood that various changes may be made in its construction and in the arrangement of parts by those skilled in the art without departing from the spirit of the invention as defined in the appended claims.

Having thus described my invention, what I claim and desire to secure by Letters Patent is:

1. In combination with a normally closed vlave, latch means retaining the valve in an open position, a hinged disc forming a part of said latch means and disposed in a predetermined plane when the latch means is effective, a universally mounted pendulum suspended beneath said hinged disc, a wobble disc secured to the pendulum and contacting said hinged disc, whereby swinging movement of the pendulum in any direction will move the hinged disc to release the latch means and permit the valve to close.

2. In a device for closing a valve automatically in the event of shock, a spring urging the valve to closed position, a pivoted valve lever engageable with the valve to hold it open, a second lever, means connecting said levers whereby the valve lever will be controlled by movement of the second lever, a disc pivotally connected with the second lever, latch means carried by the disc opposite its pivoted connection and retaining the levers in a position holding the valve open, a wobble disc underlying the first-named disc and in contact therewith, and a universally mounted pendulum fixed relative to the wobble disc whereby movement of the pendulum will rock the first named disc to release the latch and permit the valve to close.

SIDNEY H. HANSEN.